June 10, 1969   J. L. GREGG   3,449,673
TESTING SYSTEM FOR CHECKING DIODES CONNECTED IN SITU
WITH INDUCTANCE WINDINGS OF DYNAMOELECTRIC MACHINES
Filed July 15, 1964
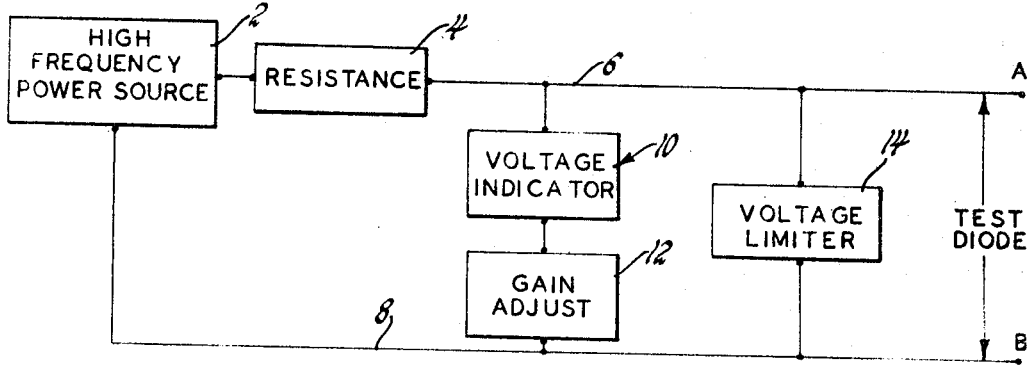
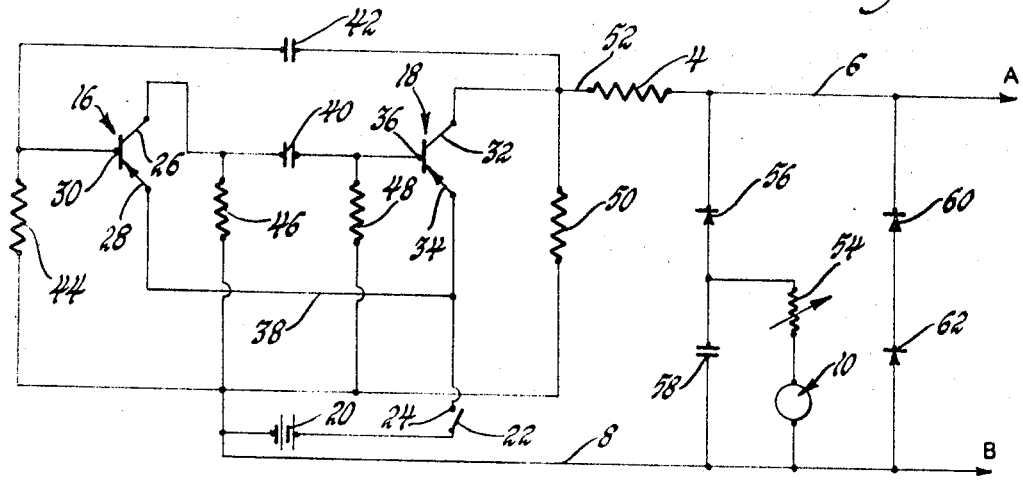
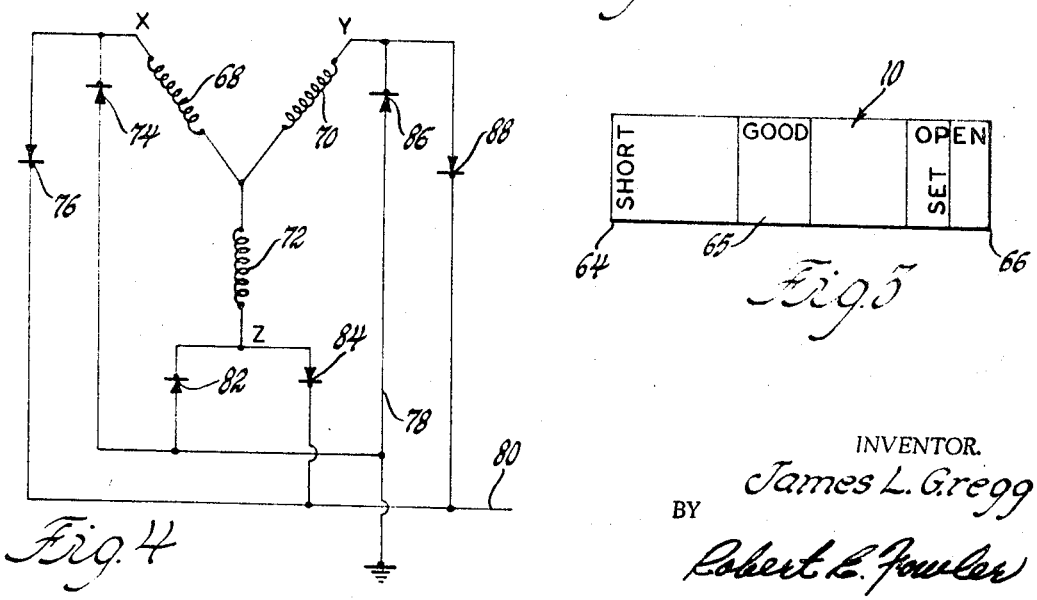
INVENTOR.
James L. Gregg
BY
Robert E. Fowler
ATTORNEY United States Patent Office 3,449,673
Patented June 10, 1969

3,449,673
TESTING SYSTEM FOR CHECKING DIODES CONNECTED IN SITU WITH INDUCTANCE WINDINGS OF DYNAMOELECTRIC MACHINES
James L. Gregg, Russiaville, Ind., assignor to General Motors Corporation, Detroit, Mich., a corporation of Delaware
Filed July 15, 1964, Ser. No. 382,832
Int. Cl. G01r 31/24
U.S. Cl. 324—158                                             1 Claim

ABSTRACT OF THE DISCLOSURE

A portable testing unit including probes that may be brought into proximity with circuitry including diodes and any diode checked for short or open circuit without disconnecting the same from its normal operative circuit. A high frequency source of power is provided so that the test voltage being applied to the diode would develop high impedance in the operative circuit associated therewith to effectively restrict the test signal solely to the diode.

---

This invention relates to testing means and more particularly to an electrical circuit for testing a component connected in a complex electrical circuit without disconnecting the same from the circuit.

Electrical systems include a plurality of components any one of which is subject to failure and when such occurs the time for checking out the system and repairing or replacing the component is costly. It is, therefore, of importance to be able to reduce the time and labor of such service, if possible. An example of a circuit of this order is that of the electrical power supply system of an automotive vehicle. Such a circuit includes an alternator and a plurality of diodes, some six in number, which are mounted in the alternator casing. To take out each diode and test the same in the event of failure is a long, time consuming task.

It is, therefore, an object in making this invention to provide a testing circuit for components connected in an operative electrical system without disconnecting the components from the system.

It is a further object in making this invention to provide testing means that can be connected to any diode connected in a complex electrical system and check it for short or open circuit without disturbing any connections.

It is a still further object in making this invention to provide a testing circuit that may be applied directly to any of the diodes in an alternator power supply system for an automotive vehicle while the diode is in place in the circuit and to fully test the diode.

With these and other objects in view which will become apparent as the specification proceeds, my invention will be best understood by reference to the following specification and claim and the illustrations in the accompanying drawings, in which:

FIGURE 1 is a block diagram of the circuit of the test system of my invention;

FIG. 2 is a detail circuit diagram of the test circuit embodying my invention;

FIG. 3 is an illustrative showing of a scale indication which might be used on the test instrument; and FIG. 4 is a circuit diagram of the alternator power supply system of an automotive vehicle which is included in order to illustrate points of connection of the test circuit.

Referring now more particularly to the drawings, it will be noted from FIG. 1 that the test system includes in general a high frequency oscillator power source 2 which is connected through a resistance 4 and supplies power across a pair of lines 6 and 8. Connected in series across these test lines is a meter or indicator 10 in series with an adjustable rheostat 12 for adjusting the same to scale. Also connected directly across the test lines is a voltage limiter section 14. Lines 6 and 8 may terminate in test probes terminals A and B.

FIG. 2 shows the specific circuitry involved in each of the elements. The oscillator consists of a pair of transistors 16 and 18 properly connected in an oscillating circuit together with a battery power source 20 and an "On" and "Off" switch 22 having a movable switch arm which engages a stationary contact 24. Transistor 16 has a collector electrode 26, emitter electrode 28 and a base electrode 30 and transistor 18 in like manner has a collector electrode 32, an emitter electrode 34 and a base electrode 36. The two emitter electrodes 28 and 34 are connected together through the line 38 and thence to the stationary contact 24 of the switch 22. The switch 22 is connected to one of the terminals of the battery 20. Collector 26 of transistor 16 is directly connected to the base electrode 36 of the transistor 18 through a coupling condenser 40. Similarly collector 32 of the transistor 18 is connected back to the base electrode 30 of transistor 16 through the coupling condenser 42. The opposite terminal of the battery 20 from that connected to the switch 22 is connected through resistor 44 to the base 30 of transistor 16, through resistor 46 to the collector 26 of the same, through resistor 48 to the base 36 of the transistor 18 and through resistance 50 to the collector 32 of the same. This provides the proper biasing and power supply for the high frequency oscillator. When the switch 22 closes the oscillator circuit just described is sufficiently unbalanced so that one of the transistors conducts changing the bias on the other to cut the same off until current flow therethrough decreases and stops due to saturation. Then the voltage applied to the opposite transistor causes it to become conductive, cutting off the first and this oscillation continues. Thus there is applied across line 52 connected to the collector 32 and line 8 a high frequency oscillatory voltage.

A limiting resistance 4 is connected in series to line 52, its opposite terminal being connected to output test line 6. The voltage indicator 10 is shown as a meter and has one terminal connected to line 8, and the other connected through a variable resistance 54 and thence through a diode 56 to the opposite line 6. By adjustment of the variable resistance 54 the proper setting of the meter 10 can be obtained. A bypass condenser 58 is connected in shunt to the meter 10 and the adjustable resistance 54. Two silicon diodes 60 and 62 are connected in series across the test lines 6 and 8 to form the voltage limiter section indicated generally at 14. Lines 6 and 8 terminate as shown in FIG. 1 in the test probes A and B.

When the switch 22 is closed to place the oscillator section in action, high frequency power is applied through the limiting resistance 4 to the power lines 6 and 8. The voltage limiter section consisting of the two series diodes 60 and 62 will limit the voltage on the lines 6 and 8 to roughly twice the forward voltage drops of the diodes to be tested with the probes unconnected. The voltage indicator 10 is now adjusted by the setting of the variable resistance 54 so that the meter will read full scale. When a good diode is connected between the two test leads A and B its forward voltage is measured and this causes a voltage drop and the indicator or meter 10 will read partial scale. If the diode being measured and appearing across the probes A and B is shorted, no voltage will be read between the probes A and B and the indicator 10 will drop to zero. If the diode being measured is open it would be just as if no diode were applied at all and full scale reading would appear on indicator 10. Thus the scale could be arranged as shown in FIG. 3 with the zero portion of the indicator meter at the lefthand side at point 64 labelled "Short" and the full scale reading on the righthand side at point 66 labelled "Open" and the central part 65 labelled "Good." High frequency is used as power source for testing the diodes so that they may be electrically isolated from other parts of the circuit such as other diodes connected to the windings, the windings having a sufficiently high impedance to prevent the other diodes from being considered in the direct circuit under test. It has been found that a frequency of 30 kilocycles is sufficiently high to provide this isolation.

To indicate how this system would be applied to an alternator power supply system, one is shown in FIG. 4. There is shown therein three windings 68, 70 and 72 of an alternator. Two diodes 74 and 76 inversely poled are connected to one terminal of winding 68. The opposite terminal of diode 74 is connected to ground line 78. The opposite pole of diode 76 is connected to power line 80 of the vehicle. In like manner two diodes 82 and 84 are connected in inverse relation between winding 72 and ground line 78 and power line 80, respectively. Lastly, diodes 86 and 88 are connected in inverse relation between winding 70 and the same two lines. The terminals of each of the three windings will be referred to as X, Y and Z, respectively. Each of the diodes 74, 82 and 86 may be individually checked by connecting the probe B to the ground and probe A to points X, Y and Z, respectively, in sequence. In like manner the diodes 76, 84 and 88 may be tested by attaching probe A to the positive line 80 and probe B to points X, Y and Z. The system, of course, is not limited to testing diodes that are connected in circuits but it will test any diode if the cathode thereof is connected to probe A and the anode to probe B.

There has thus been provided a simple, effective test circuit for quickly checking a diode while it is connected in circuit by merely placing the probes in proper relation across the diode and reading the meter calibrated as indicated in FIG. 3.

What is claimed is:

1. A system for testing a semiconductor diode where the test diode is connected in situ with the inductance windings of a dynamoelectric machine, comprising: a DC voltage source having a positive terminal and a negative terminal; a pair of transistors each having base, emitter, and collector electrodes; a pair of output resistors each connected between the collector electrode of a different one of the transistors and the negative terminal of the DC voltage source; a pair of biasing resistors each connected between the base electrode of a different one of the transistors and the negative terminal of the DC voltage source; a pair of coupling capacitors each cross-connected between the collector electrode of a different one of the transistors and the base electrode of the other transistor; a manually operable normally open switch connected between the emitter electrode of the transistors and the positive terminal of the DC voltage source so that when the switch is closed the transistors oscillate in opposite relationship between a conductive state and a nonconductive state so as to develop an AC voltage across the output resistors at a frequency determined by the RC time constant of the biasing resistors and the coupling capacitors to be at least 30 kilocycles; a pair of probe conductors connected across one of the output resistors for applying the AC voltage across the test diode wherein the high frequency of the AC voltage electrically isolates the test diode from the inductance windings of the dynamoelectric machine by greatly increasing the impedance of the inductance windings; a load resistor connected in series with one of the probe conductors; a pair of series coupled semiconductor diodes connected between the probe conductors and poled in the same sense as the test diode so as to form a parallel diode impedance combination with the test diode thereby to limit the maximum voltage across the test diode to approximately twice the rated forward voltage drop of the test diode when the test diode is positively biased by the AC voltage; a voltmeter having a visual scale for measuring the voltage across the parallel diode combination; a semiconductor diode connected in series with the voltmeter between the probe conductors and poled in the same sense as the test diode so as to enable the voltmeter to measure the voltage across the test diode only when the test diode is positively biased by the AC voltage; a bypass capacitor connected in parallel with the voltmeter to shunt transient voltages around the voltmeter; and a variable resistor connected in series with the voltmeter so as to adjust the voltmeter to read full scale when the test diode is in an open circuit condition wherein the voltage across the parallel diode combination is approximately twice the rated forward voltage drop of the test diode, half scale when the test diode is in satisfactory condition wherein the voltage across the parallel diode combination is approximately the rated forward voltage drop across the test diode, and zero scale when the test diode is in a short circuit condition wherein the voltage across the parallel diode combination is zero.

References Cited

UNITED STATES PATENTS

| 2,922,954 | 1/1960 | Bigelow | 324—158 |
| 3,227,953 | 1/1966 | Cerveny | 324—158 |
| 2,184,304 | 12/1939 | Johnson. | |
| 2,668,943 | 2/1954 | Wilson | 324—158 |
| 2,895,106 | 7/1959 | Taunt | 324—158 |
| 3,250,919 | 5/1966 | Maass | 307—88.5 |

OTHER REFERENCES

Electronic Instrumentation (Prensky), 1963, p. 7, pages 30, 31.

G.E. Controlled Rectifier Manual (first edition), March 1960, pages 198–200.

RUDOLPH V. ROLINEC, *Primary Examiner.*

E. L. STOLARUN, *Assistant Examiner.*